March 14, 1961 W. G. FIENUP ET AL 2,975,068
DOUGH PACKAGE
Filed May 26, 1958
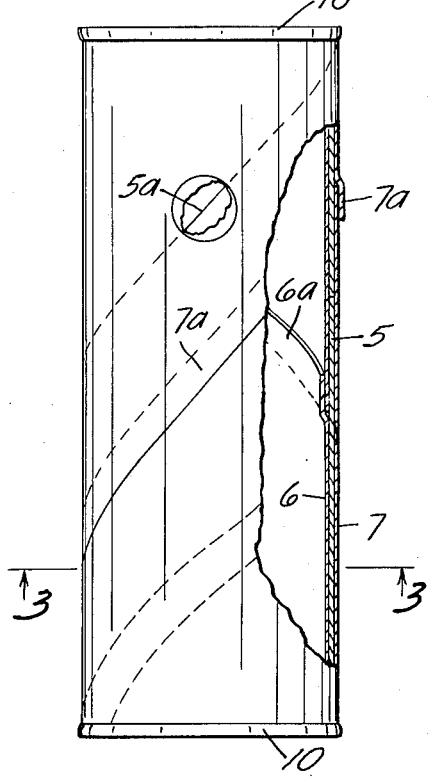
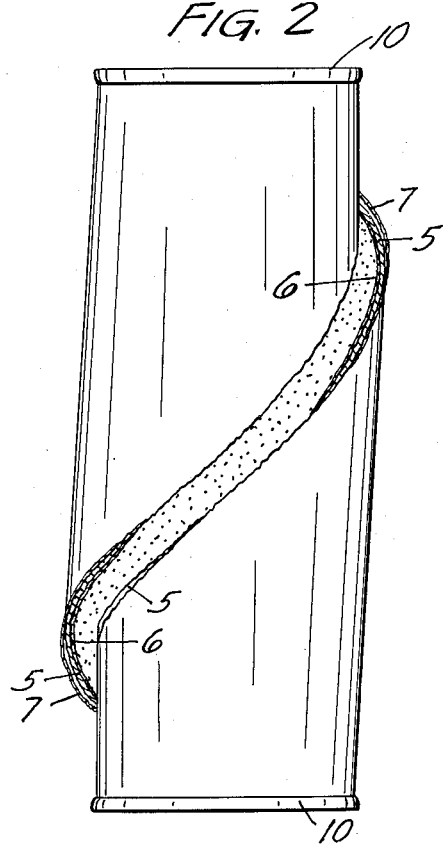
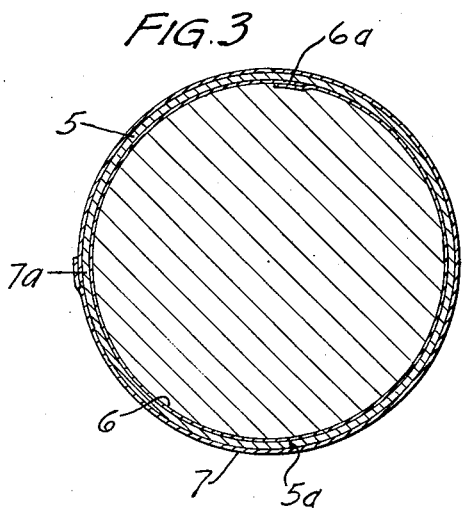
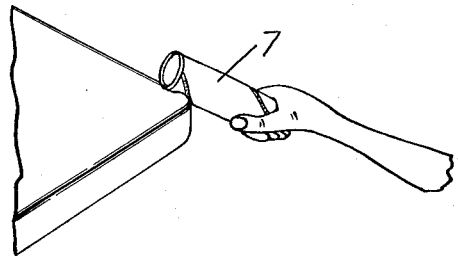
INVENTORS
WILBUR G. FIENUP
JOHN ERDIE S<sup>R</sup>
BY John W. Adams
ATTORNEY

United States Patent Office 2,975,068
Patented Mar. 14, 1961

2,975,068

DOUGH PACKAGE

Wilbur G. Fienup, St. Louis, Mo., and John Erdie, Sr., Trenton, N.J., assignors to RC Can Company, St. Louis, Mo., a corporation of Missouri Filed May 26, 1958, Ser. No. 737,946

6 Claims. (Cl. 99—172)

This invention relates generally to refrigerated dough packages and containers and to the method of opening the same, and more specifically to a container or package which eliminates the removal of any portion of the outer reinforcing layer thereof preparatory to opening the same.

The problem sought to be solved by this invention is closely related to the problem which has been successfully solved by the two prior Patents 2,793,126 and 2,793,127, both issued May 21, 1957, and both owned by the RC Can Company, assignee of the present invention. It is apparent, however, upon comparison of the structures disclosed in said two patents, with the present invention, that the cost of manufacturing containers embodying this invention will be substantially lower than the cost of manufacturing the prior structures. This is very important, particularly when considering the relatively high cost of the container relative to the cost of the dough product normally packaged therein. The prior containers also require that the housewife peel off an outer reinforcing layer. While this is not unduly burdensome, it does require an additional operation on the part of the housewife preparatory to opening the container and removing of the dough therefrom.

It is, therefore, an object of this invention to provide a container and package for refrigerated dough products of the type which exert a substantial outward bursting pressure on the side wall of the container, which container is designed for relatively inexpensive manufacture and has improved opening characteristics which will prevent mutilation and extrusion of the dough therefrom when opened, but which will entirely eliminate the need of removing any outer reinforcing layer or any portion thereof.

More specifically, it is an object to provide a relatively inexpensive container having a generally helically wound body with a helical butt joint extending the full length of the container and pitched to extend around substantially the entire circumference thereof and provided with a reinforcing and sealing liner on the inside and an outer reinforcing label wrapping superposed about said body and combining with the body and inner liner to normally confine the dough therewithin, but both the liner and outer wrapping being constructed of a material designed to rupture along the full length of said butt joint substantially instantaneously in response to localized impact as when rapped sharply on a protruding corner such as the corner of a kitchen counter or table or the like.

It is another object to provide a dough package of the class described wherein the side wall thereof is designed to normally withstand the pressure of the dough confined therewithin, but is specifically constructed to burst under said dough pressure along a helical separation line extending the full length of the container and around the complete circumference thereof, in response to the impact of a sharp blow against a protruding corner and applied at a predetermined localized area of said container at an intermediate portion of the separation line.

It is still another object to provide a new and improved method for opening a dough package which eliminates entirely the peeling off of any portion of the outer wrapper of the package.

It is another specific object to provide a method for opening a dough package which consists only in rapping the container on a protruding corner to rupture the container wall along a helically disposed weakened separation line extending the full length of the container and around the complete circumference thereof.

These and other objects and advantages of our invention will more fully appear from the following descriptions made in connection with the accompanying drawings wherein like reference characters refer to the same or similar parts throughout the several views, in which:

Fig. 1 is a side elevational view of a package embodying this invention with portions thereof broken away;

Fig. 2 is a side elevational view showing the container after the same has been opened;

Fig. 3 is a transverse sectional view taken substantially along the line 3—3 of Fig. 1; and, Fig. 4 is a perspective view showing the opening operation.

As illustrated in the accompanying drawing, we provide a container for prepared dough products. This container consists in a single layer of sheet material such as the fiber board body stock 5 which, in the form shown, is helically or spirally wound on a mandrel to form a cylindrical body wall having a helical butt joint 5a which extends the full length of the container and is pitched to extend around the complete circumference of the container. This body wall has suffiicent strength to withstand the internal pressure produced by the carbon dioxide of the dough packed therein.

Suitable means for lining such a fiber board layer 5 are provided such as the liner of foil laminated with a layer of kraft paper 6 applied to the inside of the body layer 5. In the form shown, the foil liner is also helically or spirally wound simultaneously with the winding of the body 5, is adhesively attached to the body and the edges thereof are overlapped to form a glued spiral lap joint 6a positioned out of register with the butt joint 5a. This foil liner serves two functions. The first function is to provide a substantially grease proof and moisture proof liner for the body stock layer 5 and the second is to provide an inner layer which serves to "bridge" the butt joint 5a of the body 5. The liner 6 is, in the form shown, securely adhered to at least the marginal portions of the inner surface of the body stock adjacent the butt joint 5a and provides substantial reinforcing for the body at said butt joint wherein the tensile strength of the liner 6 serves to hold the opposed edges of the butt joint together. This materially increases the strength of the container under normal packaging, shipping and storage conditions.

An outer layer 7 is, in the form shown, spirally wound on the outer surface of the body layer 5. In the form shown, the outer layer or label stock 7 is superposed about the body 5 as by being spirally wound therearound to normally reinforce the same. At the present time it is believed to be preferable to glue said outer reinforcing wrapping 7 to the body 5 along the marginal edge portions thereof adjacent the helical butt joint 5a as well as at other areas thereof, to positively hold said butt joint together and, in the form shown, the longitudinal edge portions of wrapping 7 are lapped to form a lap joint 7a out of register with the butt joint 5a.

A pair of end closures 10 are respectively applied to the ends of the tube formed by the wound layers thereof and, in the form shown, these closures are made from any suitable malleable material such as sheet steel or aluminum and are crimped over the marginal end portions of each tube. One end is applied at the time the container is originally manufactured and the other is applied after the container has been filled with dough. The unwrapped raw dough is, of course, inserted directly into the lined container and completely fills said container as the dough expands to force out all air from the container. This eliminates the possibility of mold developing in the container and prevents the closures 10 from oxidizing.

It is preferable that these containers be formed on spiral or helical winding machines since this is the most convenient way to produce the spiral weakness or separation line formed by the butt joint 5a. Although such a weakness or separation line could be formed by any suitable means such as by scoring or perforating a spiral line in the body layer 5 out of register with the butt joint formed by spiral winding of the body 5 which could then be reinforced by any suitable means so that only a single weakness or rupture line exists in the body wall 5.

Although we do not wish to be limited to the following construction, we have found that the fiber board layer 5 can be made from standard paper board stock of .026" thickness, preferably designed with substantial wet strength. The inner liner can be aluminum foil material laminated to 20- to 30-pound kraft paper and the outer wrapper can also be laminated foil material with a 30- to 60-pound kraft lamination. It will be apparent that the foil of the liner 6 will be exposed to the inside of the container and will contact the dough and the foil of the outer wrapper or label stock will be exposed to the outside and will contact the air. Thus, it will be apparent that the foil surfaces will form a seal not only on the inside of the container to prevent the moisture and oil of the dough from seeping into the fibrous board body stock 5, but also will prevent the moisture in the air from being absorbed by said fibrous body stock to maintain a substantially constant strength in the container wall. It will be noted that all of the spiral joints of the respective layers of this container will be out of register with each other to materially increase the sealing properties of the foil with respect to the weakened area of the fibrous body stock adjacent the butt joint 5a.

At present, foil appears to be the most economical and practical moisture and oil barrier for refrigerated dough. However, it is apparent that other protective materials such as treated body stock or treated paper and film liner sheets may be used in different portions of the construction as economics, protection afforded and supply dictate.

While it is, at the present time, contemplated to manufacture the container as described above, it is apparent that the main body layer 5 could be constructed of other materials such as plastic sheet material having the desired stiffness to retain the dough therein. If the material or contact surface of the body stock is impervious to and not affected by the moisture or grease of the dough, the inner liner could be eliminated from the container. The helical butt joint forming the separation line 5a could be sealed by any suitable means to prevent the moisture and grease from "wicking" into the edges of the body stock or seeping out therethrough and the outer wrapper would alone provide the necessary reinforcement to prevent expansion of the container at the butt joint 5a under the outwardly directed pressure of the dough confined therewithin. The outer wrapper would, under such conditions, be designed so that it would rupture at said separation line in response to impact of a predetermined target area against a relatively sharp protruding corner such as the corner of a table or kitchen counter top. The outer layer must be designed to immediately rupture the full length of the container under the internal outwardly directed pressure of the dough as soon as the initial tear or rupture is produced by the impact to thus immediately release the confining pressure of the container wall and prevent extrusion of the dough through a restricted opening. The impact with the protruding corner will cause indentation of the container wall at the localized area of contact which will produce the initial rupture as has been previously stated. When a liner such as the liner 6 is also provided, this material must also be constructed to immediately tear along the separation 5a, the full length of the container along with the outer wrapping in order to simultaneously release the confining pressure on the dough.

We have found that a package constructed in the manner disclosed will not rupture or burst upon reasonable impact against a straight edge even at the target area along an intermediate portion of the weakness line 5a. We have also found that impact against a protruding corner at any localized area except at the target area along said weakness line will not cause the container wall to rupture. However, the package can be easily opened if an intermediate portion of the helical separation line is rapped against a protruding corner. We have discovered that target areas spaced slightly more than one inch in from the ends of the container produce the most satisfactory opening characteristics.

It should be noted that the liner material and the wrapping material cannot together provide excessive strength for the container, otherwise the helical separation line will not rupture substantially instantaneously with the initial break in said reinforcing layers and a substantial quantity of dough under internal pressure will then be extruded through the restricted opening thus produced, thus causing mutilation and damage to the biscuit patties confined within the container as described in the prior patents identified in the second paragraph of this application. Therefore, the construction should be arranged to hold the product under all normal conditions in processing, shipping, storaging and display of the packages but still weak enough along the weakest portion (butt joint 5a of body stock) to open properly when hit at a predetermined target area along the separation line on a relatively sharp corner of an object. Present experiments indicate that a protruding corner providing a generally spherical segment having approximately one inch radius or any corner sharper than that will be satisfactory.

As previously described herein, the method of opening the container disclosed herein can be summed up in the following steps: Without unwrapping any portion of the outer layer and without any preparation of the outer layer whatever, the container is merely struck at a predetermined localized target are overlying an intermediate portion of the separation line 5a, on a relatively sharp protruding corner to produce a sharp indentation of the wall and rupture of the outer reinforcing wrapper and the inner liner adjacent the separation line. It is apparent that the greater the bursting pressure exerted by the dough the easier the package will be to open. The pressure exerted by the dough will be increased if the package is allowed to stand at room temperature after being removed from the refrigerator to increase the temperature of the dough therein although this would not normally be necessary.

It will be seen that we have provided an entirely new concept in the construction of a container for dough products and the package produced thereby when dough is confined therewithin and including a new and simplified method of opening such a package.

It will, of course, be understood that various changes may be made in the form, details, arrangement and proportions of the parts without departing from the scope of our invention which generally stated consists in the matter set forth in the appended claims.

What we claim is:

1. A dough package including a container with dough contained therein and constructed to permit said dough to be bodily removed therefrom, said container consisting essentially of a generally cylindrical fibrous body layer having linear means on the inside surface thereof for sealing the same against moisture and grease from the dough product, said body layer having a generally helical separation line extending substantially the full length of the container and pitched to extend around substantially the entire circumference thereof and being of sufficient strength to resist fracture except at said separation line, an outer reinforcing wrapper permanently superposed about said body to circumferentially reinforce the same and combine therewith to withstand the outward bursting pressure of the dough confined within said container, said wrapping overlapping said separation line and being constructed of a material to rupture substantially simultaneously along the full length of said separation line upon manual impact at a predetermined localized area of the wrapper overlying said separation line, a pair of end closures respectively closing the ends of the container, and the dough in the container being bodily removable therefrom by twisting the ends of the container in opposite directions to unwrap the container from the dough and thereby expose the dough.

2. The structure set forth in claim 1, and visual indicating means on the outside of said wrapper for identifying said predetermined localized area.

3. A dough package including a container with dough contained therein and to permit said dough to be bodily removed therefrom, said container comprising a generally cylindrical fibrous body layer having a generally helical separation line extending substantially the full length of the container and pitched to extend around substantially the entire circumference thereof and being of sufficient strength to resist fracture except at said separation line, a layer of liner material covering the inside surface of the body and overlapping said separation line to seal the inside body surface against moisture and grease from the dough product, an outer reinforcing wrapper permanently superposed about said body in overlapped relation to the separation line to seal the outside surface of the container body and circumferentially reinforce the same and combine therewith to withstand the outward bursting pressure of the dough confined within said container, said wrapper overlapping said separation line and being constructed of a material to rupture substantially simultaneously along the full length of the separation line upon manually applied impact at a predetermined localized area of the wrapper overlying said separation line, the liner material and the wrapper being disposed out of register with respect to the separation line for substantially the entire length of the container, a pair of end closures respectively closing the ends of the container, the dough in said container being bodily removed therefrom by twisting the container ends in opposite directions to unwrap the container from the dough and thereby expose the dough.

4. A dough package including a container with dough contained therein and constructed to permit said dough to be bodily removed therefrom without mutilation of the dough, said container comprising a helically wound generally cylindrical fibrous body layer having longitudinal edges thereof abutted to form a generally helical separation line extending the full length of the container and pitched to extend around substantially the entire circumference thereof, said fibrous body layer being of sufficient strength to resist fracture except at said separation line, a helically wound liner covering the inside of said body and being of a material to seal the inside surface of the body against moisture and grease from the dough product, an outer reinforcing wrapper permanently superposed about said body to circumferentially reinforce the same and combine therewith to withstand the outward bursting pressure of the dough confined within said container, said wrapper and said liner being adhesively adhered respectively to outer and inner surfaces of the body and having their respective edges out of register with the separation line of said body and each being of a material to rupture substantially simultaneously along the full length of the separation line upon manual impact of a predetermined localized area on the outside of the wrapper which area overlies said separation line, a pair of end closures respectively closing the ends of the container, and the dough in said container being bodily removable therefrom without mutilation by twisting the container ends in opposite directions to unwrap the container from the dough and thereby expose the dough.

5. The structure set forth in claim 4, where the adhesive adherence of said liner and said wrapper is at least on opposite helical marginal edge portions of the body adjacent said butt joint to seal and positively maintain the said butt joint in abutment until rupture of the wrapper and liner.

6. The structure set forth in claim 5, and said outer wrapper being helically wound about said body.

References Cited in the file of this patent
UNITED STATES PATENTS

| | | |
|---|---|---|
| 2,478,618 | Armstrong et al. | Aug. 9, 1949 |
| 2,793,126 | Fienup et al. | May 21, 1957 |
| 2,793,127 | Geist et al. | May 21, 1957 |
| 2,811,455 | Erekson | Oct. 29, 1957 |